US010771979B2

(12) United States Patent
Bai et al.

(10) Patent No.: US 10,771,979 B2
(45) Date of Patent: Sep. 8, 2020

(54) FAKE BASE STATION SHORT MESSAGE IDENTIFICATION

(71) Applicant: Alibaba Group Holding Limited, Grand Cayman (KY)

(72) Inventors: XiaoYuan Bai, Beijing (CN); Hongru Zhu, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 263 days.

(21) Appl. No.: 15/861,477

(22) Filed: Jan. 3, 2018

(65) Prior Publication Data

US 2018/0192293 A1 Jul. 5, 2018

(30) Foreign Application Priority Data

Jan. 3, 2017 (CN) .......................... 2017 1 0002521

(51) Int. Cl.
*H04W 12/12* (2009.01)
*H04L 29/06* (2006.01)
*H04W 88/18* (2009.01)

(52) U.S. Cl.
CPC ......... *H04W 12/12* (2013.01); *H04L 63/1416* (2013.01); *H04L 63/166* (2013.01); *H04W 88/184* (2013.01)

(58) Field of Classification Search
CPC ............. H04W 12/12; H04W 12/1208; H04W 12/1202; H04W 88/184; H04W 4/14; H04L 63/166; H04L 63/1416
See application file for complete search history.

(56) References Cited

U.S. PATENT DOCUMENTS 7,548,956 B1 * 6/2009 Aoki .................... G06Q 10/107
709/204
9,872,237 B1 1/2018 Wang et al.
(Continued)

FOREIGN PATENT DOCUMENTS

CN 101841784 9/2010
CN WO2017166419 10/2017
(Continued)

OTHER PUBLICATIONS

PCT Search Report and Written Opinion dated Mar. 3, 2018 for PCT Application No. PCT/US18/12244, 8 pages.

*Primary Examiner* — Lester G Kincaid
*Assistant Examiner* — Dung L Lam
(74) *Attorney, Agent, or Firm* — Lee & Hayes, P.C.

(57) ABSTRACT

A method includes: extracting a data value of receiver address field from a short message; wherein the short message sent by the short message center includes receiver address field, and the data value of the receiver address field includes the receiver's MSISDN; if the short message does not include the receiver address field or the data value is not local MSISDN such as the MSISDN of the receiver terminal, determining the short message as a fake base station short message. The MSISDN used in the present disclosure is an existing feature of the sender terminal and the receiver terminal without requiring the user to perform additional operations. Moreover, neither the short message center nor the receiver terminal needs to acquire the preset cryptogram in the gateway. Therefore, the present disclosure accurately detects a fake base station short message without requiring the user to perform additional operations.

20 Claims, 4 Drawing Sheets

(56) References Cited

U.S. PATENT DOCUMENTS

| | | | |
|---|---|---|---|
| 2005/0097321 A1* | 5/2005 | Zhu | H04L 51/12 |
| | | | 713/166 |
| 2006/0068762 A1* | 3/2006 | Baldwin | H04W 4/12 |
| | | | 455/412.1 |
| 2009/0265782 A1 | 10/2009 | Tang | |
| 2014/0179360 A1* | 6/2014 | Jackson | H04W 4/14 |
| | | | 455/466 |
| 2015/0170997 A1 | 5/2015 | Goldfarb | |
| 2015/0271194 A1 | 9/2015 | Szucs et al. | |
| 2015/0350889 A1 | 12/2015 | Jeon et al. | |
| 2016/0309332 A1 | 10/2016 | Norrman et al. | |
| 2016/0381545 A1 | 12/2016 | Wang et al. | |

FOREIGN PATENT DOCUMENTS

| | | |
|---|---|---|
| CN | WO2017185784 | 11/2017 |
| WO | WO2014149375 | 9/2014 |

\* cited by examiner

FAKE BASE STATION SHORT MESSAGE IDENTIFICATION

CROSS REFERENCE TO RELATED PATENT APPLICATIONS

This application claims priority to Chinese Patent Application No. 201710002521.4, filed on 3 Jan. 2017, entitled "Communication System and Fake Base Station Short Message Identification Method," which is hereby incorporated by reference in its entirety.

TECHNICAL FIELD

The present disclosure relates to the technical field of communications, and, more particularly, to methods and systems for fake base station short message identification.

BACKGROUND

A fake base station concerns a base station that is not a valid base station. The fake base station usually includes a host and laptop, and is movable. The fake base station usually uses high transmit power to collect terminal information within its certain radius. Then, the fake base station sends short messages to terminals in order to carry out fraud, promotion, and false propaganda.

At present, a method for identifying fake base station short message is as follows: a mobile terminal presets a cryptogram in the gateway and stores the cryptogram by itself. When receiving short message sent by the mobile terminal, the third-party platform needs to search the cryptogram in the gateway and add the cryptogram to the short message. When receiving short message sent by the third-party platform, the mobile terminal detects whether the short message includes the preset cryptogram, and the short message is determined as fake base station short message if the short message does not include the preset cryptogram.

The control process of the conventional solution is complicated, and the user needs to perform additional operations (such as presetting the cryptogram), so that the user experience is unfriendly. Therefore, there is a need for a solution that accurately detects fake base station short message without requiring the user of the receiver terminal to perform additional operations.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a system and method for identifying fake base station short message, which accurately detects fake base station short message without requiring the user to perform additional operations.

The present disclosure provides an example communication system including:
a sender terminal that sends a first short message to a short message center;

the short message center that receives the first short message sent by the sender terminal, generates a second short message to a receiver terminal according to a preset short message format, and sends the second short message to a receiver terminal, wherein the preset short message format includes a receiver address field, and a data value of the receiver address field includes the receiver's Mobile Station International Subscriber Directory Number (MSISDN). MSISDN is a number used to identify a mobile phone number internationally. For example, MSISDN is defined by the E. 164 numbering plan; and the receiver terminal that receives the second short message sent by the short message center, and extracts the data value of the receiver address field from the second short message. If the short message does not include the receiver address field or the data value of the receiver address field does not include the local MSISDN such as the MSISDN of the receiver terminal, the short message is determined as a fake base station short message.

The present disclosure also provides an example method for identifying fake base station short message. The method includes:
receiving a first short message sent by the sender terminal;
generating a second short message to a receiver terminal according to a preset short message format, wherein the preset short message format includes a receiver address field, and a data value of the receiver address field includes the receiver's Mobile Station International Subscriber Directory Number (MSISDN). MSISDN is a number used to identify a mobile phone number internationally. For example, MSISDN is defined by the E. 164 numbering plan; and
sending the second short message to a receiver terminal.

For example, the preset short message format includes: a Short Message Service Center Number (SCA), a Protocol Data Unit Type (PDU-Type), an Originator Address (OA), a Destination Address (DA), a Protocol Identification (PID), a Data Coding Scheme (DCS), a Service Center Time Stamp (SCTS), a User Data Length (UDL), and a User Data (UD). The DA corresponds the receiver address field.

For example, the sending the second short message to the receiver terminal includes:
acquiring an International Mobile Subscriber Identity (IMSI) corresponding to the MSISDN;
querying a current location corresponding to the IMSI in the Home Location Register (HLR);
sending the second short message to the Mobile Switching Center (MSC) corresponding to the current location;
sending the second short message to the receiver terminal by the MSC.

The present disclosure also provides another example method for identifying fake base station short message. The method includes:
extracting the data value of the receiver address field from the short message, wherein the short message sent by the short message center includes the receiver address field, and the data value of the receiver address field includes the receiver's MSISDN;
if the short message does not include the receiver address field or the data value is not the local MSISDN such as the MSISDN of the receiver terminal, determining the short message as a fake base station short message.

For example, after determining the short message as the fake base station short message, the method further includes:
controlling the short message to be invisible in a display area of the valid short message.

For example, the controlling the short message to be invisible in the display area of the valid short message may include:

deleting the short message; or, displaying the short message in the display area of the invalid short message.

For example, the method may further comprise:

if the short message includes the receiver address field and the data value is local MSISDN such as the MSISDN of the receiver terminal, determining the short message as a non-fake base station short message or valid short message; and displaying the short message in the display area of the valid short message.

The present disclosure also provides an example terminal, which comprises:

a communication module that receives the short message;

one or more processors that extracts the data value of the receiver address field from the short message. The short message sent by the short message center should include the receiver address field, and the data value of the receiver address field includes the receiver's MSISDN. If the short message does not include the receiver address field or the data value is not local MSISDN such as the MSISDN of the receiver terminal, the short message is determined as a fake base station short message. If the short message includes the receiver address field and the data value is local MSISDN such as the MSISDN of the receiver terminal, the short message is determined as a non-fake base station short message or valid short message;

The processors control the short message to be invisible in the display area of the valid short message after determining the short message as a fake base station short message; and send the short message to the display module after determining the short message as a non-fake base station short message or valid short message; and a display module displays the short message in the display area of the valid short message.

The present disclosure also provides an example short message center, which includes:

a communication module that receives the first short message sent by the sender terminal and sends the second short message to the receiver terminal;

one or more processors that generate the second short message to a receiver terminal according to the received first short message and preset short message format, wherein the preset short message format includes receiver address field, and the data value of the receiver address field includes the receiver's MSISDN.

The following beneficial effects are achieved through the above technical solutions:

The present disclosure modifies the format of the short message generated by the short message center, adds the receiver address field to the modified short message format, and specifies that the data value of the receiver address field includes the receiver's MSISDN, i.e., the receiver's cell phone number. Since the fake base station cannot acquire the receiver's MSISDN, the short message sent by the fake base station does not include the receiver's MSISDN, and even does not include the receiver address field.

Therefore, after receiving the short message, the receiver terminal extracts the data value of the receiver address field from the short message. Since the short message sent by the short message center includes the receiver address field and the data value of the receiver address field does not include local MSISDN such as the MSISDN of the receiver terminal, if the short message does not include the receiver address field or the data value of the receiver address field does not include local MSISDN, the short message is determined as a fake base station short message.

Compared with conventional technologies, the MSISDN used in the example embodiment of the present disclosure is an existing feature of the sender terminal and the receiver terminal, and user does not need to add it intentionally. Furthermore, the short message center does not need to acquire the preset cryptogram in the gateway, and the receiver terminal does not need to store the preset cryptogram. Thus, the implementation process of the short message center and the receiver terminal is relatively simple. Therefore, the present disclosure accurately detects a fake base station short message without requiring the user to perform additional operations.

BRIEF DESCRIPTION OF THE DRAWINGS

In order to illustrate the technical solutions in the example embodiments of the present disclosure clearly, the drawings for illustrating the example embodiments are briefly introduced as follows. One of ordinary skill in the art may obtain other figures according to the FIGs without using creative efforts.

DETAILED DESCRIPTION

In conjunction with the following FIGs of the present disclosure, the technical solutions of the present disclosure will be described. Apparently, the described example embodiments merely represent some of the embodiments of the present disclosure and are not to be construed as limiting the present disclosure. All other embodiments obtained by those of ordinary skill in the art based on the example embodiments of the present disclosure fall within the scope of protection of the present disclosure.

The explanations of terminologies used in the present disclosure are listed below:

GSM: Global System for Mobile Communication, which is a 2G communication standard.

IMEI: International Mobile Equipment Identity, which is a 15-digit "electronic serial number" that corresponds to each mobile phone and is unique worldwide.

IMSI: International Mobile Subscriber Identification Number, which is an identification that distinguishes mobile subscribers. International Mobile Subscriber Identity Number is stored on the SIM card and can be used to distinguish valid information from mobile subscribers.

PDU: Protocol Data Unit.

MSISDN: Mobile Subscriber International ISDN/PSTN number. (ISDN is the abbreviation for Integrated Service Digital Network.) MSISDN refers to the number dialed by the calling user (which is a user that initiates a communication, such as a call, text, or data communication) for calling a mobile user in the GSM PLMN, i.e., the only number that can identify the mobile user; in general, it is the user's mobile phone number.

MSC: Mobile Switching Center. Mobile Switching Center is one of the core network elements of a 2G communication system and is the place where call conversion services and call control are provided between a cell phone and a data system.

HLR: Home Location Register, which is a database in charge of mobile user management. HLR stores and records its covered subscriber's subscription data permanently and dynamically updates the subscriber's location information to provide a network routing of a called user (which is a user that receives a communication, such as a call, text, or data communication) in the call service.

Figure 1A:
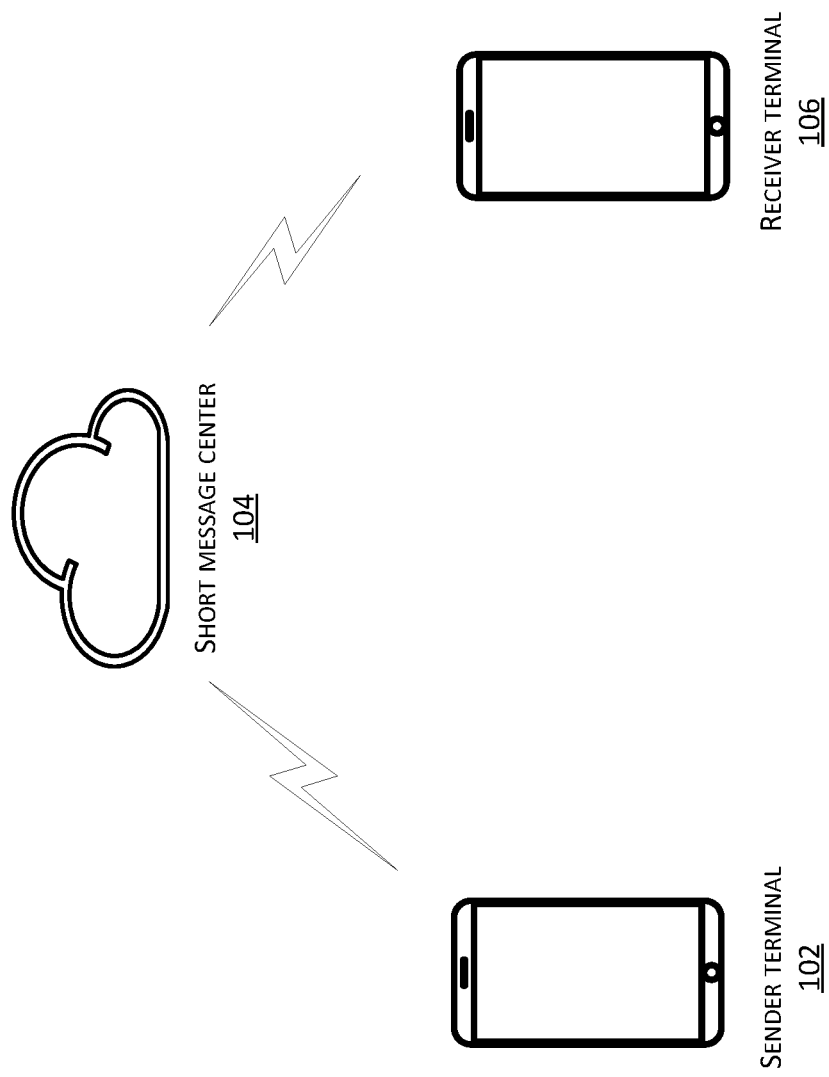
FIG. 1(A) is a diagram of an example communication system according to an example embodiment of the present disclosure.

For the convenience of those of ordinary skill in the art, a communication system is introduced first. Referring to FIG. 1(A), an example communication system includes a sender terminal 102, a short message center 104, and a receiver terminal 106.

Figure 1B:
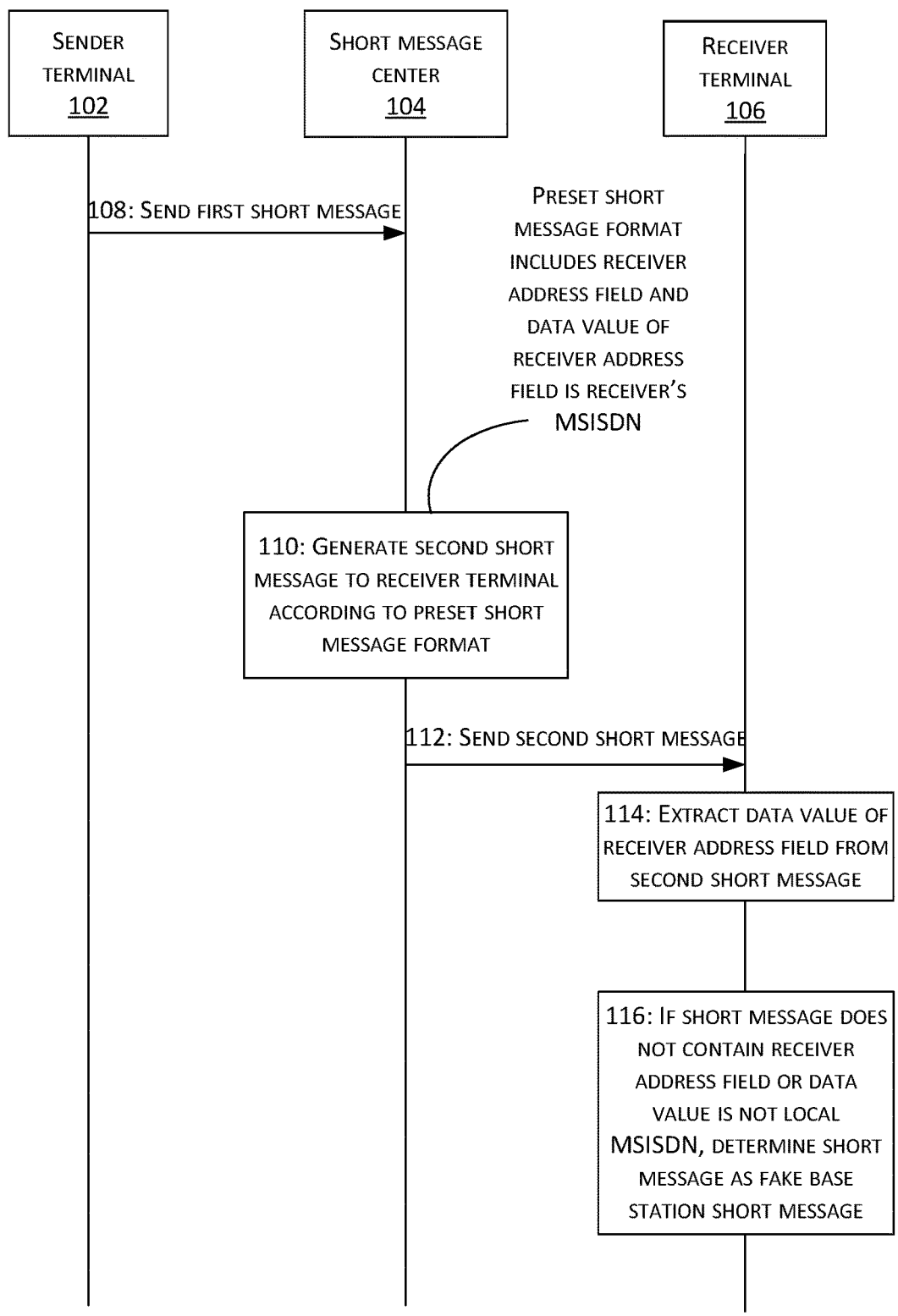
FIG. 1(B) is a flowchart of an example method for identifying fake base station short message identification according to an example embodiment of the present disclosure.

Referring to FIG. 1(B), the following describes the specific implementation of each part of the communication system.

At 108, the sender terminal 102 sends a first short message to the short message center 104.

When the sender terminal 102 wants to send a short message to the receiver terminal 106, the first short message is generated according to a PDU short message format of sending a short message. In order to indicate the receiver terminal 106, a MSISDN of the receiver terminal 102, i.e., the cell phone number of the receiver terminal, is included in the first short message generated by the sender terminal 102. After generating the first short message, the sender terminal 102 sends the first short message to the short message center 104.

In this example embodiment, the process of generating the first short message by the sender terminal 102 and sending the first short message to the short message center 104 is a mature technology, and details are not described herein again.

The short message center 104 receives the short message sent by the sender terminal 102. At 110, the short message center 104 generates a second short message to the receiver terminal 106 according to a preset short message format. At 112, the short message server 104 sends the second short message to the receiver terminal 106. The preset short message format includes a receiver address field, and the data value of the receiver address field includes a unique identification that identifies the receiver terminal 106. The unique identification may be a built-in feature of the receive terminal 106 that does not need to be created by a user of the receiver terminal. For example, the unique identification is MSISDN of the receiver terminal 106.

At present, the fake base station uses the GSM frequency band. The fake base station usually uses a high transmit power to attract the user's mobile terminal to camp on and pretends to be a valid base station to send an identification request to the terminal. After obtaining the fake base station identification request, the terminal sends IMSI and IMEI to the fake base station. However, the fake base station cannot obtain the MSISDN of the terminal, i.e., the cell phone number of the terminal, while the valid short message center has the MSISDN of the terminal, i.e., the cell phone number of the terminal.

Therefore, the present disclosure modifies the PDU short message format in which the short message center 104 generates the short message, adds the receiver address field in the original PDU short message format, and the data value of the receiver address field includes MSISDN, i.e., the cell number of the receiver terminal.

The modified PDU short message format is shown in Table 1.

TABLE 1

| Parameter | Length | Description |
|-----------|--------|-------------|
| SCA | 1-12 | Short message Service Center Number |
| PDU-Type | 1 | Protocol Data Unit Type |
| OA | 2-12 | Originator Address (cell phone number) |
| DA | 2-12 | Destination Address (cell phone number) |
| PID | 1 | Protocol ID that indicates the way in which the short message center deals with user data |
| DCS | 1 | Data Coding Scheme |
| SCTS | 7 | Service Center Time Stamp |
| UDL | 1 | User Data Length |
| UD | 0-140 | User Data |

After receiving the first short message sent by the sender terminal 102, the short message center 104 extracts the receiver's MSISDN, i.e., the receiver's cell phone number, and generates a second short message to the receiver terminal according to the modified PDU short message format, wherein the data value of the receiver address field includes the receiver's MSISDN.

After generating the second short message sent to the receiver terminal 106, the short message center 104 sends the second short message to the receiver terminal 106. For example, the short message center 104 acquires an IMSI corresponding to the MSISDN, queries a current location corresponding to the IMSI in the HLR, and sends the second short message to the MSC of the current location. Then the MSC sends the second short message to the receiver terminal 106.

The specific process of sending the second short message to the receiver terminal 106 by the short message center 104 is already a mature technology, and details are not described herein again.

The receiver terminal 106 receives a second short message. At 114, the receiver terminal 106 extracts the data value of receiver address field from the second short message. At 116, if the second short message does not include the receiver address field or the data value is not the unique identification that identifies the receiver terminal 106, such as the local MSISDN or the MSISDN of the receiver terminal, the short message is determined as a fake base station short message.

After receiving the second short message, the receiver terminal 106 firstly extracts the receiver address field from the second short message. If the short message does not include the receiver address field, which means that the short message is sent by the fake base station instead of the short message center, then the receiver terminal 106 determines that short message as a fake base station short message.

If the short message includes the receiver address field, the data value of the receiver address field includes extracted. Then, the receiver terminal 106 determines whether the data value of the receiver address is consistent with the unique identification of the receiver terminal 106 such as the local MSISDN or the MSISDN of the receiver terminal of the receiver's terminal.

If the data value of the receiver address is inconsistent with the unique identification of the receiver terminal 106 such as the local MSISDN or the MSISDN of the receiver terminal, that means the short message is not sent by the short message center, and the short message is determined to be a fake base station short message sent by the fake base station. In order to prevent the fake base station short message from affecting applications, the short message may be controlled to be invisible in the display area of the valid short message, i.e., the fake base station short message is not displayed in the inbox.

There are two methods of controlling the short message to be invisible in the valid short message display area.

The first method is to display the short message in the display area of the invalid short message. For example, the fake base station short message is displayed in the spam folder of the receiver terminal.

Since the fake base station short message is about advertising, fraud, etc., in order not to affect the user, fake base station short message may be displayed in the spam box instead of the inbox. Normally short message in spam box is not displayed to user. Such message will be displayed only if the user checks the spam box intentionally.

Therefore, after putting the fake base station short message in the spam box, user can be prevented from being affected by fake base station short message significantly.

The second method is to delete the short message.

In the first method, fake base station short messages are stored in the spam box. However, more and more fake base station short messages will occupy more and more storage space, and affect the terminal usage. Since the fake base station short messages usually are not useful, user can delete the short messages directly to prevent the fake base station short messages occupying the storage space of the terminal.

In addition, if the data value of the receiver address is consistent with the local MSISDN or the MSISDN of the receiver terminal, that means the short message is sent from the short message center instead of the fake base station, and the short message is determined as a non-fake base station short message or valid short message. In order to facilitate the user to check the short message normally, the short message may be displayed in the display area of the valid short message. For example, the valid short message is displayed in the inbox of the sender terminal 106.

At least the following beneficial effects are achieved through the above methods:

The present disclosure modifies the format of the short message generated by the short message center, adds the receiver address field to the modified short message format, and specifies that the data value of the receiver address field includes the receiver's MSISDN, i.e., the receiver's cell phone number. Since the fake base station cannot acquire the receiver's MSISDN, the short message sent by the fake base station does not include the receiver's MSISDN, and even does not include the receiver address field.

Therefore, after receiving the second short message, the receiver terminal extracts the data value of the receiver address field from the second short message. Since the second short message sent by the short message center includes the receiver address field and the data value of the receiver field is MSISDN, if the short message does not include the receiver address field or the data value of the receiver address is not local MSISDN such as the MSISDN of the receiver terminal, then the short message is determined as a fake base station short message.

Compared with conventional technologies, the MSISDN used in this example embodiment is an existing or built-in feature of the sender terminal 104 and the receiver terminal 106, and does not need to be added by the user intentionally. Moreover, the short message center 104 does not need to acquire the preset cryptogram in the gateway, and the receiver terminal 106 does not need to store the preset cryptogram. Thus, the implementation process at the short message center 104 and receiver terminal 106 is relatively simple. Therefore, the present disclosure accurately detect a fake base station short message without requiring the user to perform additional operations.

Figure 2:
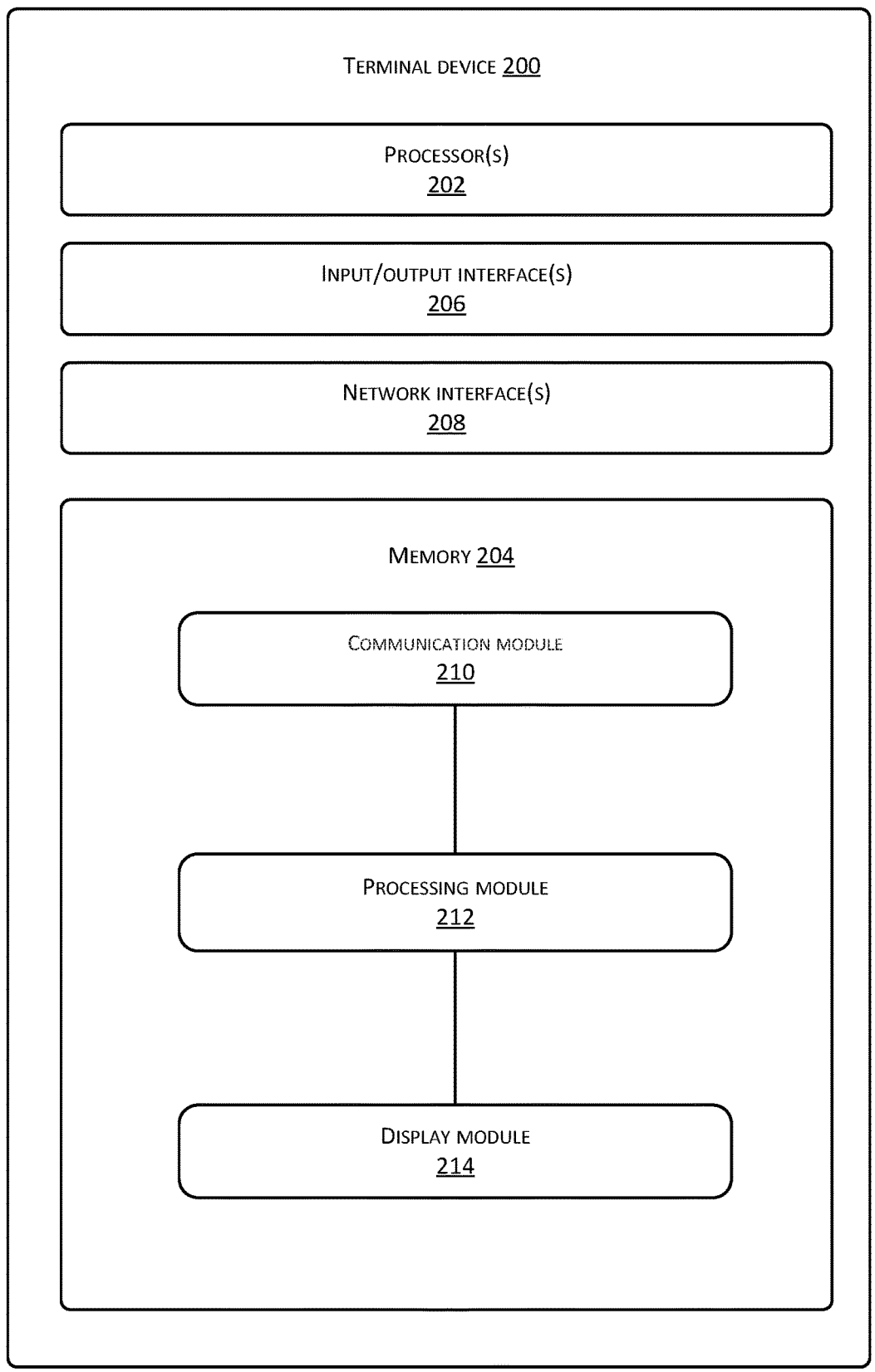
FIG. 2 is a diagram of an example terminal according to an example embodiment of the present disclosure.

Referring to FIG. 2, the present disclosure provides an example terminal device 200. The terminal device 200 may act as either the sender terminal or the receiver terminal as described herein.

The terminal device 200 includes one or more processor(s) 202 or data processing unit(s) and memory 204. The terminal device 200 may further include one or more input/output interface(s) 206 and one or more network interface(s) 208. The memory 204 is an example of computer readable media.

Computer readable media, including both permanent and non-permanent, removable and non-removable media, may be stored by any method or technology for storage of information. The information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory Such as ROM, EEPROM, flash memory or other memory technology, CD-ROM, DVD, or other optical storage, Magnetic cassettes, magnetic tape magnetic tape storage or other magnetic storage devices, or any other non-transitory medium, may be used to store information that may be accessed by a computing device. As defined herein, computer-readable media do not include non-transitory transitory media such as modulated data signals and carriers.

The memory 204 may store therein a plurality of modules or units including a communication module 210, a processing module 212, and a display module 214.

The communication module 210 receives the short message;

The processing module 212 extracts the data value of the receiver address field from the short message. The short message sent by the short message center includes the receiver address field, and the data value of the receiver address field includes a unique identification that identifies the terminal device 200. The unique identification may be a built-in feature of the terminal device 200. For example, the unique identification is MSISDN of the receiver terminal. If the short message does not include the receiver address field or the data value is not local MSISDN or the MSISDN of the receiver terminal, then the processing module 212 determines the short message as a fake base station short message. If the short message includes the receiver address field and the data value is local MSISDN or the MSISDN of the receiver terminal, the processing module 212 determines the short message as a non-fake base station short message or valid short message.

The processing module 212 controls the short message to be invisible in the display area of the valid short message after determining the short message as a fake base station short message. The processing module 212 sends the short message to the display module 214 after determining the short message as a non-fake base station short message or valid short message.

The display module 214 displays the short message in the display area of the valid short message.

For the execution process of the processor in this embodiment, reference may be made to the execution process of the receiver terminal in the embodiment in FIG. 1(B), and details are not described herein again.

Figure 3:
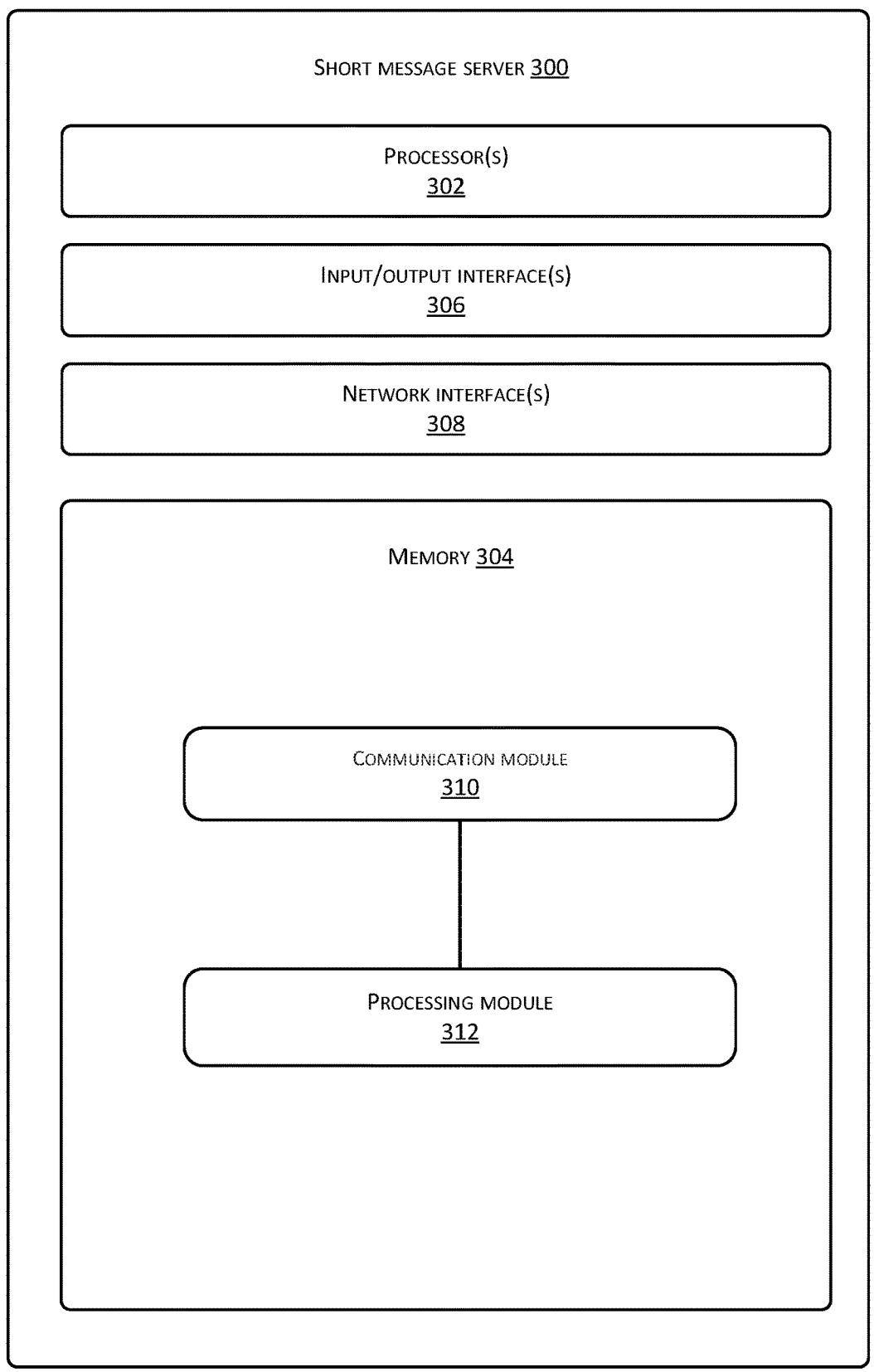
FIG. 3 is a diagram of an example short message center according to an example embodiment of the present disclosure.

Referring to FIG. 3, the present disclosure further provides an example short message server 300. The short message center 300 may act as the short message center.

The short message server 300 includes one or more processor(s) 302 or data processing unit(s) and memory 304. The short message server 300 may further include one or more input/output interface(s) 306 and one or more network interface(s) 308. The memory 304 is an example of computer readable media.

The memory 304 may store therein a plurality of modules or units including a communication module 310 and a processing module 312.

The communication module 310 receives the first short message sent by the sender terminal and sends the second short message to the receiver terminal;

The processing module 312 generates the second short message to a receiver terminal according to the received first short message and a preset short message format. The preset short message format includes receiver address field, and the data value of the receiver address field includes a unique identification that identifies the receiver terminal. The unique identification may be a built-in feature of the receive terminal that does not need to be created by a user of the receiver terminal. For example, the unique identification is MSISDN of the receiver terminal.

For the execution process of the processor in this embodiment, reference may be made to the execution process of the short message center in the embodiment in FIG. 1(B), and details are not described herein again.

When the functions described in the method of this embodiment are implemented in the form of software functional units and sold or used as independent products, they can be stored in a computing terminal readable storage medium. Based on such understanding, the part of the embodiments of the present disclosure that makes contributions to conventional technologies or the part of the technical solution may be embodied in the form of a software product. The software product is stored in the memory and includes computer-readable instructions for causing a computing device including one or more processors, which may be a personal computer, a server, a mobile computing terminal or a network terminal, to execute all or parts of the steps of the method described in each embodiment of the present disclosure. The memory includes various media capable of storing program code, such as a USB flash disk, a removable hard disk, a read-only memory (ROM), a random-access memory (RAM), a magnetic disk, or an optical disk.

The example embodiments in the present specification are described in a progressive manner. Each embodiment focuses on the differences from other embodiments, and the same or similar parts among the embodiments may refer to each other.

The above example embodiments help understand the method and principles of the present disclosure. One of ordinary skill in the art may, according to the ideas and principles of the present disclosure, change the specific implementation and application scope of the techniques of the present disclosure, which shall still fall under the protection of the present disclosure. The content of the specification and drawings shall not be construed as limitation to the present disclosure.

The present disclosure may further be understood with clauses as follows.

Clause 1. A communication system comprising:
a sender terminal that sends a first short message to a short message center;
the short message center that receives the first short message sent by the sender terminal, generates a second short message to a receiver terminal according to a preset short message format, and sends the second short message to a receiver terminal, wherein the preset short message format includes a receiver address field, and a data value of the receiver address field includes the receiver's Mobile Station International Subscriber Directory Number (MSISDN); and
the receiver terminal that receives the second short message sent by the short message center, and extracts the data value of the receiver address field from the second short message; if the short message does not include the receiver address field or the data value is not local MSISDN such as the MSISDN of the receiver terminal, the short message is determined as a fake base station short message.

Clause 2. A method for identifying fake base station short message, comprising:
receiving a first short message sent by the sender terminal;
generating a second short message to a receiver terminal according to a preset short message format; wherein the preset short message format includes a receiver address field, and a data value of the receiver address field includes the receiver's Mobile Station International Subscriber Directory Number (MSISDN); and
sending the second short message to a receiver terminal.

Clause 3. The method of clause 2, the preset short message format including:
a Short Message Service Center Number (SCA), a Protocol Data Unit Type (PDU-Type), an Originator Address (OA), a Destination Address (DA), a Protocol Identification (PID), a Data Coding Scheme (DCS), a Service Center Time Stamp (SCTS), a User Data Length (UDL), and a User Data (UD).

Clause 4. The method of clause 2, the second sending short message to the receiver terminal including:
acquiring an International Mobile Subscriber Identity (IMSI) corresponding to the MSISDN;
querying a current location corresponding to the IMSI in the Home Location Register (HLR);
sending the second short message to the Mobile Switching Center (MSC) corresponding to the current location that the receiver terminal is located; and
sending the second short message to the receiver terminal by the Mobile Switching Center (MSC).

Clause 5. A method for identifying fake base station short message, comprising:
extracting the data value of the receiver address field from the short message, wherein the short message sent by the short message center includes the receiver address field, and the data value of the receiver address field includes the receiver's MSISDN; and
if the short message does not include the receiver address field or the data value is not the local MSISDN such as the MSISDN of the receiver terminal, determining the short message as a fake base station short message.

Clause 6. The method of clause 5, after determining the short message as the fake base station short message, further including:
controlling the short message to be invisible in a display area of the valid short message.

Clause 7. The method of clause 6, the controlling the short message to be invisible in the display area of the valid short message comprising:
deleting the short message; or
displaying the short message in the display area of the invalid short message.

Clause 8. The method of clause 5, further comprising:
if the short message includes the receiver address field and the data value is local MSISDN such as the MSISDN of the receiver terminal, determining the short message as a non-fake base station short message or valid short message; and
displaying the short message in the display area of the valid short message.

Clause 9. A terminal comprising:
a communication module that receives the short message; and
one or more processors that extract the data value of the receiver address field from the short message, wherein the short message sent by the short message center should include the receiver address field, and the data value of the receiver address field includes the receiver's MSISDN; if the short message does not include the receiver address field or the data value is not local MSISDN such as the MSISDN of the receiver terminal, determining the short message as a fake base station short message; and if the short message includes the receiver address field and the data value is local MSISDN such as the MSISDN of the receiver terminal, determining the short message as a non-fake base station short message or valid short message.

Clause 10. The terminal of clause 9, further comprising:
the processors control the short message to be invisible in the display area of the valid short message after determining the short message as a fake base station short message; and send the short message to the display module after determining the short message as a non-fake base station short message or valid short message; and
a display module, which displays the short message in the display area of the valid short message.

11. A short message center comprising:
a communication module that receives the first short message sent by the sender terminal and sends the second short message to the receiver terminal; and
one or more processors that generate the second short message to a receiver terminal according to the received first short message and preset short message format, wherein the preset short message format includes receiver address field, and the data value of the receiver address field includes the receiver's MSISDN.

What is claimed is:

1. A system comprising:
a short message center and a receiver terminal,
the short message center configure to:
receive a first short message sent by a sender terminal,
generate a second short message to a receiver terminal by adding a receiver address field of the receiver terminal to the received first short message in according to a preset short message format, and
send the second short message to the receiver terminal;
wherein: the preset short message format includes a receiver address field and a data value of the receiver address field includes a Mobile Station International Subscriber Directory Number (MSISDN) of the receiver terminal,
the receiver terminal configured to:
determine whether the second short message is a fake base station short message by extracting the receiver address field,
determine the second short message as a fake base station short include the receiver address field and the data value of the receiver address field does not include the MSISDN of the receiver terminal, and
delete the fake base station short message in response to determining that short message is the fake base station short message.

2. The system of claim 1, wherein the Mobile Station International Subscriber Directory Number (MSISDN) of the receiver terminal is a phone number of the receiver terminal.

3. The system of claim 1, further comprising:
the sender terminal that sends the first short message to the short message center.

4. The system of claim 1, further comprising:
the receiver terminal that receives the second short message sent by the short message center, and extracts the data value of the receiver address field from the second short message.

5. The system of claim 4, wherein:
the receiver terminal, in response to determining that the second short message does not include the receiver address field or the data value is not the MSISDN of the receiver terminal, determines the second short message as a fake base station short message.

6. The system of claim 5, wherein:
the receiver terminal deletes the fake base station short message.

7. The system of claim 5, wherein:
the receiver terminal displays the fake base station short message in a spam folder of the receiver terminal.

8. The system of claim 4, wherein:
the receiver terminal, in response to determining that the data value of the receiver address field includes the MSISDN of the receiver terminal, determines the second short message as a valid message.

9. The system of claim 1, wherein the preset short message format further includes:
a Short Message Service Center Number (SCA);
a Protocol Data Unit Type (PDU-Type);
an Originator Address (OA);
a Protocol Identification (PID);
a Data Coding Scheme (DCS); and
a Service Center Time Stamp (SCTS), a User Data Length (UDL), and a User Data (UD).

10. A method comprising:
receiving, by a short message center, a first short message sent by a sender terminal;
generating, by the short message center, a second short message to a receiver terminal by adding a receiver address field of the receiver terminal to the received first short message in according to a preset short message format;
sending, by the short message center, the second shod message to the receiver terminal;
determining, by the receiver terminal, whether the second short message is a fake base station short message by extracting the receiver address field;
wherein the preset short message format includes the receiver address field, and a data value of the receiver address field includes a unique identification of the receiver terminal that is a feature of the receive terminal;

determining, by the receiver terminal, the second short message as a fake base station short message in response to determining that the second short message does not include the receiver address field and the data value of the receiver address field does not include the MSISDN of the receiver terminal; and deleting, by the receiver terminal, the fake base station short message in response to determining that short message is the fake base station short message.

11. The method of claim 10, wherein:
the unique identification is a Mobile Station International Subscriber Directory Number (MSISDN) of the receiver terminal.

12. The method of claim 11, wherein the Mobile Station International Subscriber Directory Number (MSISDN) of the receiver terminal is a phone number of the receiver terminal.

13. The method of claim 10, wherein sending by the short message center the second short message to the receiver terminal includes:
acquiring an International Mobile Subscriber Identity (IMSI) corresponding to the MSISDN;
querying a current location corresponding to the IMSI in a Home Location Register (HLR); and
sending the second short message to the Mobile Switching Center (MSC) corresponding to the current location of the receiver terminal to request the MSC to send the second short message to the receiver terminal.

14. The method of claim 10, wherein the preset short message format further includes:
a Short Message Service Center Number (SCA);
a Protocol Data Unit Type (PDU-Type);
an Originator Address (OA);
a Protocol Identification (PID);
a Data Coding Scheme (DCS); and
a Service Center Time Stamp (SCTS), a User Data Length (UDL), and a User Data (UD).

15. One or more memories storing thereon computer-readable instructions that, when executed by the one or more processors, cause the one or more processors to perform acts comprising:
receiving, a short message sent from a short message center;
extracting, by a receiver terminal, a data value of a receiver address field from the short message;
determining, by the receiver terminal, whether the short message includes the receiver address field and whether the data value includes a local Mobile Station International Subscriber Directory Number (MSISDN); and
determining, by the receiver terminal, the short message as a fake base satiation short message in response to determining that the short message does not include the receiver address field and the data value does not include the MSISDN of the receiver terminal;
deleting, by the receiver terminal, the fake base station short message in response to determining that short message is the fake base station short message.

16. The one or more memories of claim 15, wherein the Mobile Station International Subscriber Directory Number (MSISDN) of the receiver terminal is a phone number of the receiver terminal that receives the short message.

17. The one or more memories of claim 15, wherein the acts further comprise:
controlling the short message to be invisible in a display area of the valid short message.

18. The one or more memories of claim 15, wherein the controlling the short message to be invisible in the display area of the valid short message includes:
deleting the short message;
or, displaying the short message in a display area of an invalid short message.

19. The one or more memories of claim 15, wherein the acts further comprise:
in response to determining that the short message includes the receiver address field and the data value does not include the local MSISDN, determining the short message as a non-fake base station short message; and
displaying the short message in a display area of a valid short message.

20. The one or more memories of claim 15, wherein the short message further includes:
a Short Message Service Center Number (SCA);
a Protocol Data Unit Type (PDU-Type);
an Originator Address (OA);
a Protocol Identification (PID);
a Data Coding Scheme (DCS); and
a Service Center Time Stamp (SCTS), a User Data Length (UDL), and a User Data (UD).

* * * * *